United States Patent
Chen et al.

(10) Patent No.: US 9,397,549 B2
(45) Date of Patent: Jul. 19, 2016

(54) POWER CONVERSION SYSTEM FOR CONTROLLING HARMONICS

(71) Applicant: Chung-Shan Institute of Science and Technology, Armaments Bureau, M.N.D, Taoyuan County (TW)

(72) Inventors: Kun-Feng Chen, Taoyuan County (TW); Kuo-Kuang Jen, Taoyuan County (TW); Jong-Chin Hwang, Taoyuan County (TW); Po-Cheng Chen, Taoyuan County (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 291 days.

(21) Appl. No.: 14/217,299

(22) Filed: Mar. 17, 2014

(65) Prior Publication Data

US 2015/0263599 A1 Sep. 17, 2015

(51) Int. Cl.
| | |
|---|---|
| *H02P 21/00* | (2016.01) |
| *H02M 1/12* | (2006.01) |
| *H02M 7/44* | (2006.01) |
| *H02M 7/48* | (2007.01) |

(52) U.S. Cl.
CPC .......... *H02M 1/12* (2013.01); *H02M 7/44* (2013.01); *H02M 7/48* (2013.01)

(58) Field of Classification Search
CPC . H02M 1/12; H02M 7/5395; H02M 7/53871; H02M 7/537; H02P 21/0035; H02P 21/141; H02P 6/18; H02P 6/10; H02P 6/00; H02P 2209/071; H02P 27/08; B62D 5/0463; G01R 31/343
USPC ........... 363/40, 41, 98, 131; 318/400.02, 700, 318/400.23, 400.2, 400.3, 432, 490, 802, 318/727
See application file for complete search history.

(56) References Cited

U.S. PATENT DOCUMENTS

2013/0033205 A1* 2/2013 Furukawa ........... H02P 21/0003 318/400.02
2013/0082636 A1* 4/2013 Ohori ........................ H02P 4/00 318/723

* cited by examiner

*Primary Examiner* — Nguyen Tran
(74) *Attorney, Agent, or Firm* — Chun-Ming Shih

(57) ABSTRACT

A power conversion system for controlling harmonics, which uses the Fourier transform analysis to calculate the harmonics element of each current, and adds the harmonics compensation strategy into the control strategy of the DC-AC power converter so as to decrease the harmonics element generated from the actual current.

3 Claims, 4 Drawing Sheets

US 9,397,549 B2

POWER CONVERSION SYSTEM FOR CONTROLLING HARMONICS

BACKGROUND OF THE INVENTION

1. Field of the Invention

The present invention relates to a power conversion system, and more particularly to a power conversion system for controlling harmonics, which can decrease the current harmonics distortion rate.

2. Description of the Related Art

Most of the regenerated energy source outputs the DC power, which is converted into the AC power through the DC-AC power converter with parallel configuration. Thereby, the output electric quality is very important for the electric power system, and it is a few ideas and plans for the related technology about the power converter.

Taiwan Patent Application Number 100106112 discloses a transformer with new type of the refraction line, and it can eliminate the odd harmonics expect for 24n±1 orders. Thereby, the transformer with the new type of the refraction line is the passive element and adds the extra size and cost. Moreover, the majority application range is the voltage source inverter and its application is limited; Taiwan application number 99136014 uses the 3-phase multilevel current source transform with the parallel configuration to overcome the specific harmonics, and however, there is the circulation problem in the 3-phase multilevel current source transform with the parallel configuration. Thereby, the zero order sequence current harmonics generated is solved by the extra compensation control strategy of the zero order sequence harmonics; Taiwan application number 99114137 changes the PWM signal to eliminate the low order harmonics, and however, it must consider that the load character of the low pass filter in practice. Generally speaking, the higher load feature impedance needs to match the element with higher inductance, and therefore, it must to know the load character to design the low pass filter so as to effectively eliminate the harmonics. Thereby, the method can not be used widely; Taiwan application number 95113130 uses the PWM and the random sampling to eliminate the harmonics, and however, the method uses the Fourier analysis and the random sampling theory to eliminate the switched angles of the different harmonics. Thereby, it makes the load heavy and is unfit for the controller because there are too many nonlinear equations and the switched angle solutions are obtained by the iteration; Taiwan Patent Application Number 99143779 uses the vector control unit to eliminate the zero phase sequence harmonic wave, and however, it needs the extra voltage detection device including the adder and the controller when the vector control unit receives the 3-phase voltage status. Thereby, it is easy to generate the operation uncertainty because the extra hardware such as an adder and a controller are added.

European Patent Number 0319910B1 discloses harmonics suppression control circuit for a PWM inverter, and it uses the voltage at the feedback load terminal to analyze the harmonics element. Thereby, it can control PWM signal by checking the table so as to decrease the specific harmonics element. However, because there are a wide variety of loads to choose from, the information of the switch angle of PWM is too large to decrease the assigned harmonics element compensation stored in memory. It will bring the confusion for the digital signal processor with the limited memory capacity. European Patent Number 0906654B1 discloses power line harmonics reduction by hybrid parallel active/passive filter system with square wave inverter and dc bus control, and it uses the mixed filter with parallel configuration to decrease the harmonics element of the system. However, because the passive filter is composed of the capacitors and inductors, the size of the filter must be large if it performs to filter the harmonics current with lower frequency. The current controller of the synchronously rotating coordinate axis is built by the hardware as the active power filter, and therefore, the electric elements are easily affected by the age and the environment, for example, temperature, humidity, etc., and it is easy to damage the controller or cause the bad performance of the controller. U.S. Patent Publication Number 20130076293 discloses Mid-voltage variable-frequency driving system and total harmonics distortion compensation control method, and it adjusts the current reactive power of AC side in the 3-phase power factor rectifier to decrease the current harmonics element in the AC power. Because the distortion compensation method of the total current harmonics generates the total current harmonics distortion compensation conditions by feeding the current of the AC power back, analyzing and calculating the total current harmonics distortion rate, the angle difference between the voltage and current of the AC power and the power factor of the AC power so as to adjust the reference instruction value of the reactive power, and therefore it needs to analysis the three conditions to adjust the reference instruction of the reactive power for compensating the total harmonics distortion so as to increasing the calculation load of analyzing the program.

For the reason that the conventional method and device could not effectively solve the mentioned problems, a need has arisen to propose a power conversion system for controlling harmonics which effectively eliminate the harmonics.

SUMMARY OF THE INVENTION

In view of the foregoing, it is an object of the present invention to provide a power conversion system for controlling harmonics, which uses the Fourier analysis to calculate the harmonics element of each current, and adds the harmonic compensation strategy into the control strategy of the DC-AC power converter to eliminate the harmonics generated from the actual current.

To achieve the object above, a power conversion system for controlling harmonics is disclosed according to one embodiment of the present invention. The power conversion system for controlling harmonics comprises: a DC terminal; a DC-AC power converter, electrically coupled to the DC terminal and electrically coupled to an AC terminal via a transformer; and a digital operational unit, electrically coupled to the DC-AC power converter and the transformer, for controlling a power output of the DC-AC power converter by using a control strategy; wherein the side of the transformer coupled to the AC terminal is referred to an AC side, and the digital operational unit uses the Fourier transform (FT) to calculate a current harmonics amount of the AC side. When the current harmonics distortion rate exceeds a certain limit, the digital operation unit adds the harmonics compensation strategy into the control strategy, to offset the harmonics component generated by the current.

The power conversion system for controlling harmonics of the present invention uses the prior art feedback hardware circuit and software operation analysis to perform compensation control of the harmonics interference. Compared with the conventional technology, the present invention does not need the extra hardware, and have the less operation and the simple compensation strategy so as to decrease the calculation load of the digital signal processor, and immediately adjust the load according to the different characters. Thereby, the application range is better than the conventional technology.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
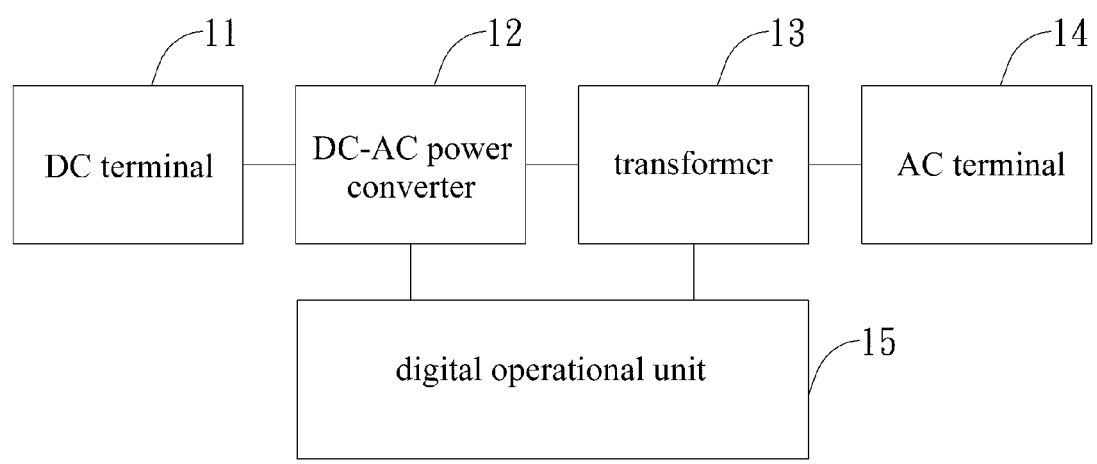
FIG. 1 illustrates a structure diagram of a power conversion system for controlling harmonics.

Referring to FIG. 1, which is the structure diagram of a power conversion system for controlling harmonics. As shown, the power conversion system comprises: a DC terminal 11; a DC-AC power converter 12, which is electrically coupled to the DC terminal 11; a transformer 13, electrically coupled to the DC terminal 11; an AC terminal 14, which is coupled to the transformer 13; and a digital operational unit 15, which is coupled to the DC-AC power converter and the transformer 13 for controlling a power output of the DC-AC power converter by using a control strategy; wherein one side of the transformer 13 being coupled to the AC terminal is called to an AC side, and the digital operational unit 15 uses the Fourier transform (FT) to calculate a current harmonics amount of the AC side. When the current harmonics distortion rate exceeds a certain limit, the digital operation unit adds the harmonics compensation strategy into the control strategy, to offset the harmonics component generated by the current.

In the embodiment of the present invention, the Fourier transform analysis is performed as below: In the three phase balancing system, if the current in the AC side does not have the zero sequence current and the even-order harmonics element, the current includes odd-order harmonics element (5, 7, 11, 13 orders), and the expression is represented as below (1), the 3-phase AC current is converted to the d-q axis by the synchronously rotating coordinate axis, and the expression is represented as below (2). Specifically, the d-axis current and the q-axis are respectively the cosine and sine function, and the frequency is changed to a sixfold frequency of the fundamental wave.

$i_{Rh} + I_5 \sin[5(\theta_e + \delta)] + I_7 \sin[7(\theta_e + \delta)] + L$ $i_{Sh} = I_5 \sin[5(\theta_e - 120° + \delta)] + I_7 \sin[7(\theta_e - 120° + \delta)] + L$ $i_{Th} = I_5 \sin[5(\theta_e + 120° + \delta)] + I_7 \sin[7(\theta_e + 120° + \delta)] + L$  (1)

$i_{dh} = -I_5 \cos[6(\theta_e + \delta)] + I_7 \cos[6(\theta_e + \delta)] + L$ $i_{qh} = I_5 \sin[6(\theta_e + \delta)] + I_7 \sin[6(\theta_e + \delta)] + L$  (2)

Figure 2:
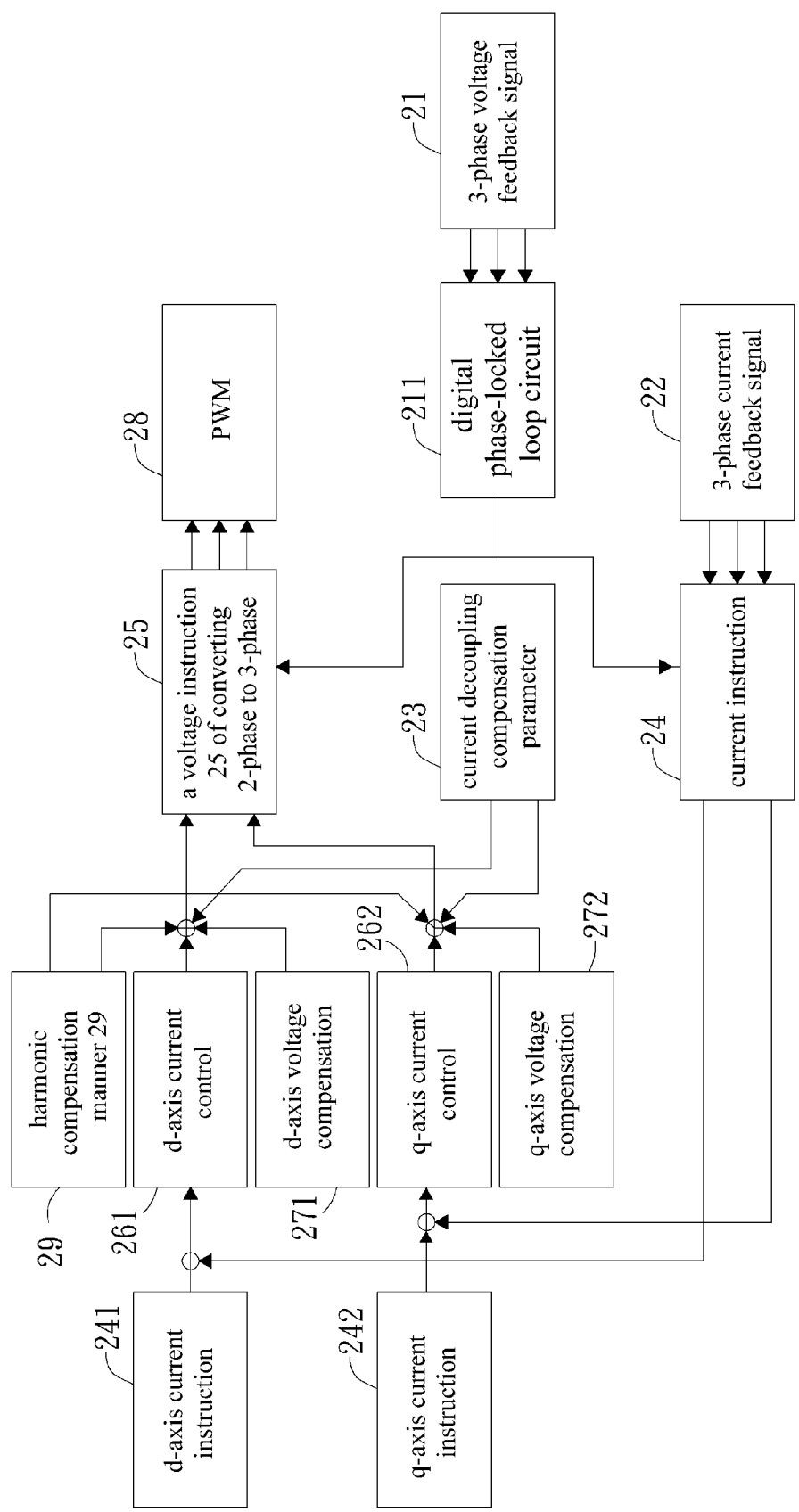
FIG. 2 illustrates a block diagram of the control strategy of the digital operational unit in the power conversion system for controlling harmonics of the present invention.

Referring to FIG. 2, which is the block diagram of the control strategy of the digital operational unit in the power conversion system for controlling harmonics of the present invention. In the embodiment, the control strategy comprises: receiving a 3-phase voltage feedback signal 21 and a 3-phase current feedback signal 22 from the AC terminal (the AC side), and preliminary defining a current decoupling compensation parameter 23; providing a 3-phase reference coordinates to a current instruction 24 of converting 3-phase to 2-phase and a voltage instruction 25 of converting 2-phase to 3-phase through a digital phase-locked loop circuit 211; feeding the current instruction 24 of converting 3-phase to 2-phase back to an input terminal, and combining the current instruction and a d-axis current instruction 241 and a q-axis current instruction 242; respectively having the d-axis current control 261 and the q-axis current control 262, having a d-axis voltage compensation 271 and a q-axis voltage compensation 272 and combining the current decoupling compensation and the harmonics compensation strategy 29, and controlling the PWM 28 by the 2-phase to 3-phase voltage instruction 25. Compared with the traditional technology, the present invention adds a harmonics compensation strategy 29 to decrease the current harmonics element of the 3-phase AC power. In the d-axis voltage compensation and the q-axis voltage compensation, an inverse harmonics voltage instruction is added into the d-axis voltage compensation and the q-axis voltage compensation. Specifically, the inverse harmonics voltage instruction is built by the Fourier transform, such as the expressions (1) and (2), so as to obtain a inverse sixfold frequency of harmonics voltage instruction v*$_{dh}$ and v*$_{qh}$ and the expression as below (3). Thereby, the current harmonics element of the 3-phase AC power is decreased so as to improve the total current harmonics distortion rate.

$v^*_{dh} = V^*_5 \cos[6(\hat{\theta}_e + \delta)] - V^*_7 \cos[6(\theta_e + \delta)] + L$ $V^*_{qh} = -V^*_5 \sin[6(\hat{\theta}_e + \delta))] - V^*_7 \sin[6(\theta_e + \delta)] + L$  (3)

Figure 3:
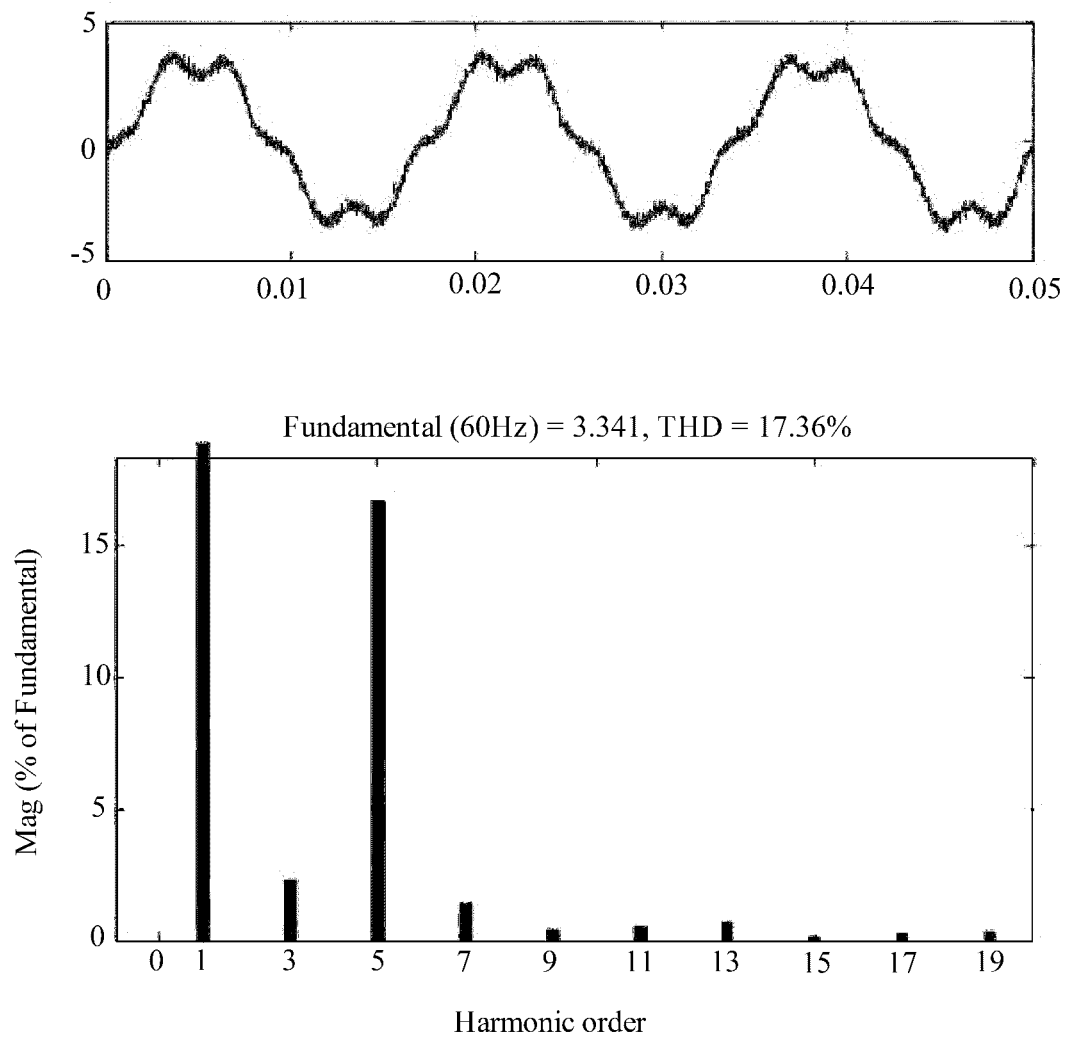
FIG. 3 illustrates the current output waveform diagram of the traditional AC power converter with parallel configuration.
Figure 4:
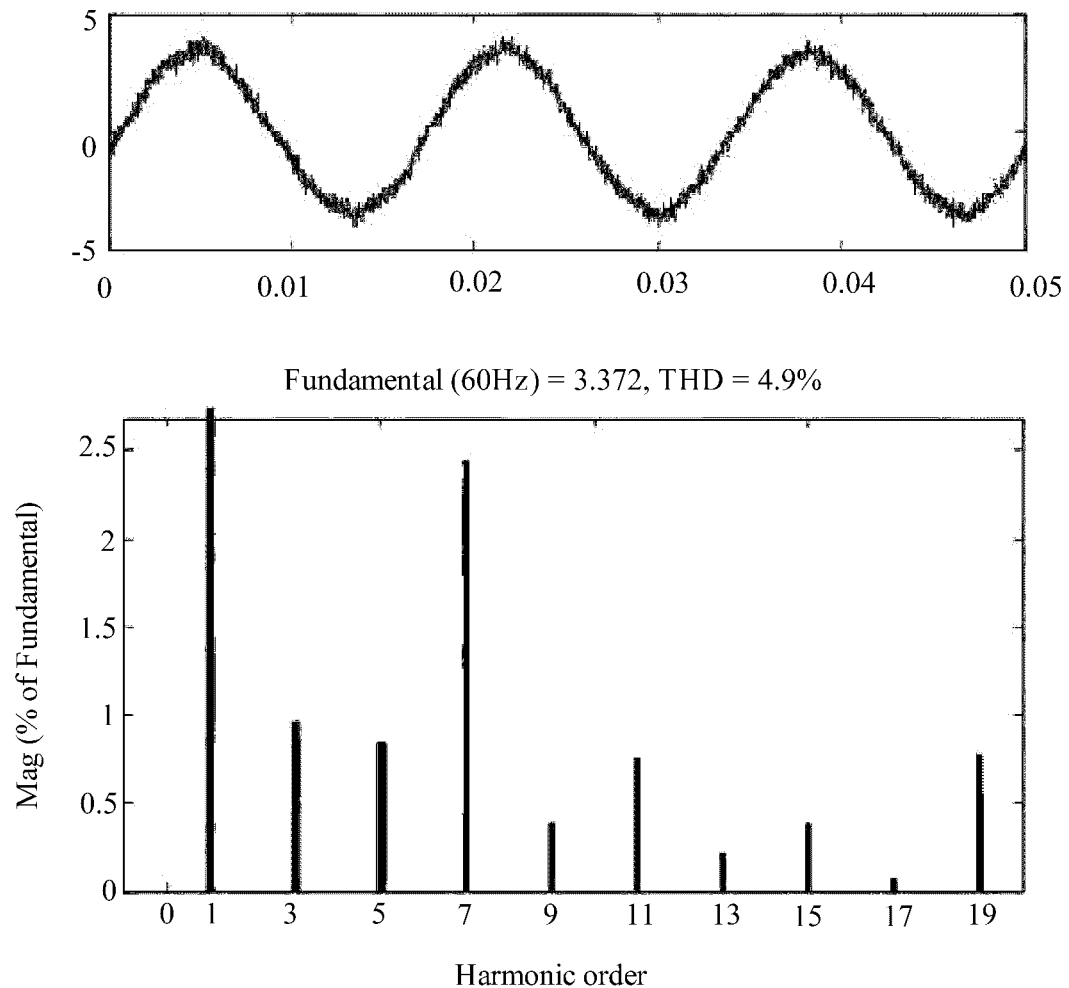
FIG. 4 illustrates the current output waveform diagram of the present invention.

FIGS. 3 and 4 show comparison results of current output waveform of the present invention and the tradition technology. In the traditional technology, the harmonics compensation is not added into the control strategy of the power converter with parallel configuration, and its waveform is shown in FIG. 3. From FIG. 3, the current output waveform of the AC terminal is not steady, and the total harmonics distortion ratio (THD) is 17.36%, so as to generate the reactive power and AC pollution, caused in it does not match the standard specification. The power conversation system for controlling harmonics of the present invention is used to match the current harmonics standard, and its current output waveform from the AC side is shown in FIG. 4, and the THD improvement is 4.9%. Compared with the tradition technology, the output waveform of the power conversation system for controlling harmonics is better, and matches the standard condition of under 5% of the total current harmonics distortion ratio (THD).

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A power conversion system for controlling harmonics, comprising:
  a DC terminal;
  a DC-AC power converter, electrically coupled to the DC terminal and electrically coupled to an AC terminal via a transformer; and
  a digital operational unit, electrically coupled to the DC-AC power converter and the transformer, for controlling a power output of the DC-AC power converter by using a control strategy;
  wherein one side of the transformer being coupled to the AC terminal is called to an AC side, and the digital operational unit uses the Fourier transform (FT) to calculate a current harmonics amount of the AC side, and the digital operational unit adds a harmonics compensation strategy to decrease harmonics elements generated from an actual current;

wherein the control strategy of the digital operational unit comprises:

receiving a 3-phase voltage feedback signal and a 3-phase current feedback signal from the AC terminal, and preliminary defining a current decoupling compensation parameter;

providing a 3-phase reference coordinates to a current instruction of converting 3-phase to 2-phase and a voltage instruction of converting 2-phase to 3-phase;

feeding the current instruction of converting 3-phase to 2-phase back to an input terminal, and combining the current instruction and a d-axis current instruction and a q-axis current instruction;

respectively controlling the d-axis current and the q-axis current, compensating a d-axis voltage and a q-axis voltage and combining the current decoupling compensation and the harmonic compensation strategy, and controlling the PWM by the 2-phase to 3-phase voltage instruction.

2. The power conversion system for controlling harmonics of claim 1, wherein the harmonics compensation strategy comprises:

adding an inverse harmonic voltage instruction in the d-axis voltage compensation and the q-axis voltage compensation.

3. The power conversion systems for controlling harmonics of claim 1, wherein the inverse harmonics voltage instruction is built by the Fourier transform.

* * * * *